United States Patent
Yamazaki et al.

(10) Patent No.: US 12,449,370 B2
(45) Date of Patent: Oct. 21, 2025

(54) COATING EVALUATION DEVICE AND COATING EVALUATION METHOD

(71) Applicant: Nissan Motor Co., Ltd., Yokohama (JP)

(72) Inventors: Shota Yamazaki, Kanagawa (JP); Takahiro Kaito, Kanagawa (JP); Kentarou Yuge, Kanagawa (JP); Mori Nagayama, Kanagawa (JP); Yoshitaka Uehara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 186 days.

(21) Appl. No.: 18/572,223

(22) PCT Filed: Jun. 13, 2022

(86) PCT No.: PCT/IB2022/000312
§ 371 (c)(1),
(2) Date: Dec. 20, 2023

(87) PCT Pub. No.: WO2022/269342
PCT Pub. Date: Dec. 29, 2022

(65) Prior Publication Data
US 2024/0369494 A1 Nov. 7, 2024

(30) Foreign Application Priority Data
Jun. 21, 2021 (WO) .................. PCT/IB2021/000416

(51) Int. Cl.
*G01N 21/84* (2006.01)
*G01B 11/06* (2006.01)
(Continued)

(52) U.S. Cl.
CPC ......... *G01N 21/8422* (2013.01); *G01B 11/24* (2013.01); *G01B 11/30* (2013.01);
(Continued)

(58) Field of Classification Search
CPC ........... G01N 21/8422; G01N 21/8851; G01N 21/4738; G01N 2021/0125;
(Continued)

(56) References Cited

U.S. PATENT DOCUMENTS 5,092,676 A * 3/1992 Harata ............... G01N 21/8422
356/124.5

FOREIGN PATENT DOCUMENTS

| JP | H3-26943 A | 2/1991 |
| JP | H6-160300 A | 6/1994 |

(Continued)

*Primary Examiner* — Jamil Ahmed
(74) *Attorney, Agent, or Firm* — GLOBAL IP COUNSELORS, LLP (57) ABSTRACT

In a coating evaluation device and a coating evaluation method, information on a coating is acquired. The information on a coating includes material information representing a material of a coating surface, and at least one of shape information representing a curved shape of the coating surface, and surface roughness information representing a surface roughness of the coating surface. An evaluation value that corresponds to a combination of the material information, the shape information, and the surface roughness information is estimated by using an evaluation model that outputs a brilliance evaluation value pertaining to the coating surface in response to an input including the material information, the shape information, and the surface roughness information.

21 Claims, 2 Drawing Sheets

(51) Int. Cl.
  *G01B 11/24* (2006.01)
  *G01B 11/30* (2006.01)
  *G01N 21/47* (2006.01)
  *G01N 21/88* (2006.01)
  *G01N 21/01* (2006.01)

(52) U.S. Cl.
  CPC ...... *G01N 21/8851* (2013.01); *G01B 11/0625* (2013.01); *G01N 2021/0125* (2013.01); *G01N 21/4738* (2013.01); *G01N 2021/8427* (2013.01); *G01N 2021/8893* (2013.01)

(58) Field of Classification Search
  CPC ... G01N 2021/8427; G01N 2021/8893; G01B 11/24; G01B 11/30; G01B 11/0625
  See application file for complete search history.

(56) References Cited

FOREIGN PATENT DOCUMENTS

| | | |
|---|---|---|
| JP | 2006-266728 A | 10/2006 |
| JP | 2019-500588 A | 1/2019 |

\* cited by examiner

COATING EVALUATION DEVICE AND COATING EVALUATION METHOD

CROSS-REFERENCE TO RELATED APPLICATIONS

This application is a U.S. national stage application of International Application No. PCT/IB2022/000312, filed on Jun. 13, 2022, which claims priority to International Application No. PCT/IB2021/000416 published on Jun. 21, 2021. The entire disclosure of International Application No. PCT/IB2021/000416 is incorporated herein by reference.

BACKGROUND

Technical Field

The present invention relates to a coating evaluation device and a coating evaluation method.

Background Technology

An invention is known that selectively measures a size of an amplitude in undulations having a wavelength of 1 to 10 mm, from among undulations in a surface of a coating, and evaluates a coating appearance of the surface of the coating according to a magnitude of measurement results (See, Japanese Laid-Open Patent Application No. 2006-266728, herein after Patent Document 1).

SUMMARY

In the invention disclosed in Patent Document 1, a problem is presented in that when, e.g., the coating surface is curved, error can arise in the amplitude of undulations being selectively measured and accuracy in evaluating brilliance of the coating surface can decrease.

The present invention was contrived in view of the above problem, it being an object of the invention to provide a coating evaluation device and a coating evaluation method with which it is possible to accurately evaluate brilliance of a coating surface.

In a coating evaluation device and a coating evaluation method according to one aspect of the present invention, any of material information representing a material of a coating surface, shape information representing a curved shape of the coating surface, or surface roughness information representing a surface roughness of the coating surface is acquired. An evaluation value that corresponds to a combination of the material information, the shape information, and the surface roughness information is estimated by using an evaluation model that outputs a brilliance evaluation value pertaining to the coating surface in response to an input including the material information, the shape information, and the surface roughness information.

Accordingly, the present invention makes it possible to accurately evaluate brilliance of a coating surface.

BRIEF DESCRIPTION OF THE DRAWINGS

Referring now to the attached drawings which form a part of this original disclosure.

DETAILED DESCRIPTION OF EMBODIMENTS

A preferred embodiment of the present invention is described below with reference to the drawings. Identical portions disclosed in the drawings are assigned identical reference symbols and are not redundantly described.

Figure 1:
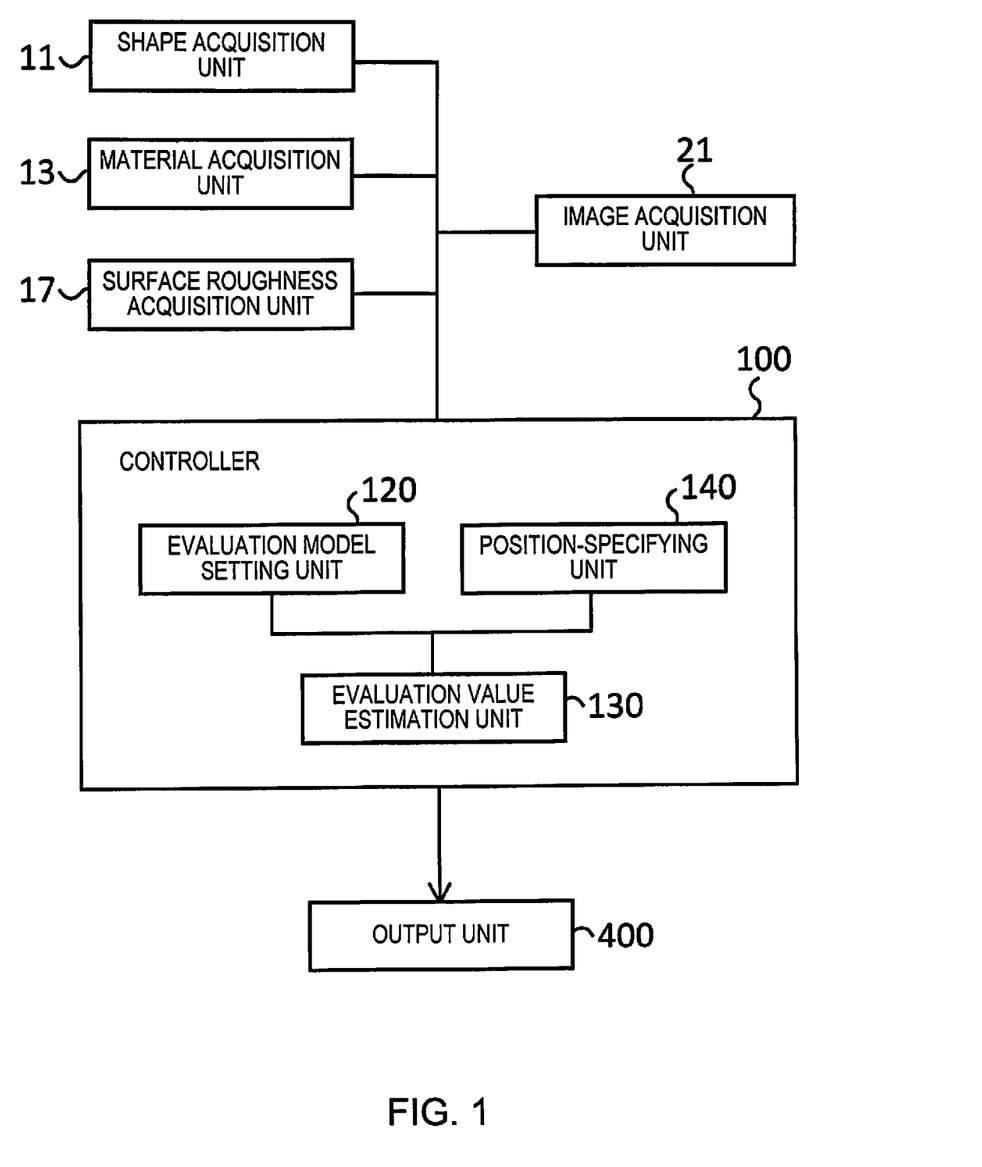
FIG. 1 is a block diagram showing a configuration of a coating evaluation device according to one embodiment of the present invention.

An example of a configuration of a coating evaluation device according to the present embodiment shall be described with reference to FIG. 1. As shown in FIG. 1, the coating evaluation device comprises a shape acquisition unit 11, a surface roughness acquisition unit 17, and a controller 100. The coating evaluation device can also comprise a material acquisition unit 13, an image acquisition unit 21, and an output unit 400. The shape acquisition unit 11, the material acquisition unit 13, the surface roughness acquisition unit 17, the image acquisition unit 21, and the output unit 400 are connected to the controller 100.

The shape acquisition unit 11 acquires shape information representing a curved shape of a coating surface for which a coating is being evaluated. More specifically, the shape acquisition unit 11 can acquire design data pertaining to the shape of the coating surface as the shape information. Examples of the design data include computer-aided design (CAD) data. The design data is not limited to CAD data, provided that the design data represents an extent of curving (curvature) of the coating surface or an extent of sloping of the coating surface with respect to a surface roughness acquisition unit (described later).

The shape acquisition unit 11 can acquire stored design data pertaining to the coating surface from a database (not shown) or can acquire the design data pertaining to the coating surface from external connection equipment (not shown) via a wired or wireless network. In addition, the shape acquisition unit 11 can acquire the design data on the basis of an input from a user.

The shape acquisition unit 11 can also acquire measurement data obtained by measuring the coating surface as the shape information. Examples of the shape acquisition unit 11 include 3D scanners and various other devices.

The material acquisition unit 13 acquires material information representing a material of the coating surface. More specifically, the material acquisition unit 13 acquires, as the material information pertaining to the coating surface, design data pertaining to a type of material constituting the coating surface, a film thickness (coating thickness) of each layer constituting the coating surface, optical characteristics (such as material reflectivity, material transparency, and material refractive index), a brightness, a saturation, a hue, or the like. In addition, the material acquisition unit 13 can acquire information pertaining to an amount, shape, or orientation of a lustrous material contained in the coating as the material information pertaining to the coating surface.

The material acquisition unit 13 can acquire stored material information pertaining to the coating surface from a database (not shown) or can acquire the material information pertaining to the coating surface from external connection equipment (not shown) via a wired or wireless network. In addition, the material acquisition unit 13 can acquire the material information on the basis of the input from the user.

The material acquisition unit 13 can also acquire, as the material information, measurement data that is obtained by measuring the coating surface and that pertains to the film thickness of each layer constituting the coating surface, the optical characteristics, the brightness, the saturation, the hue, or the like. Examples of the material acquisition unit 13 include film thickness gauges, spectrum colorimeters, chromometers, reflectivity measuring instruments, refractive index measuring instruments, and various other devices.

The surface roughness acquisition unit 17 acquires surface roughness information representing a surface roughness of the coating surface. More specifically, the surface roughness acquisition unit 17 can acquire a surface roughness obtained by measuring the coating surface as the surface roughness information. Examples of the surface roughness acquisition unit 17 include laser microscopes.

Additionally, the surface roughness acquisition unit 17 can acquire stored surface roughness information pertaining to the coating surface from a database (not shown) or can acquire the surface roughness information pertaining to the coating surface from external connection equipment (not shown) via a wired or wireless network. In addition, the surface roughness acquisition unit 17 can acquire the surface roughness information on the basis of the input from a user.

The image acquisition unit 21 acquires a captured image of the coating surface for which the coating is being evaluated. More specifically, the image acquisition unit 21 is a digital camera provided with a CCD, a CMOS, or another solid-state imaging element, the image acquisition unit 21 imaging the coating surface and acquiring a digital image.

In the image acquisition unit 21, a focal length, an angle of view of a lens, an angle formed by a direction perpendicular to the camera and a horizontal direction, and other such factors are set, whereby the coating surface for which the coating is being evaluated is imaged.

The controller 100 is a general-purpose computer provided with a central processing unit (CPU), a memory, a storage device, an input/output unit, and the like.

A computer program (coating evaluation program) for causing the controller 100 to function as the coating evaluation device is installed in the controller 100. Executing the computer program results in the controller 100 functioning as a plurality of information processing circuits provided to the coating evaluation device.

In the present case, an example is described in which the plurality of information processing circuits provided to the coating evaluation device are realized using software, but as shall be apparent, it is also possible to prepare dedicated hardware (indicated below) to constitute the information processing circuits. The plurality of information processing circuits can also be configured from individual articles of hardware.

The controller 100 is provided with an evaluation model setting unit 120, an evaluation value estimation unit 130, and a position-specifying unit 140.

The evaluation model setting unit 120 sets an evaluation model that outputs a brilliance evaluation value pertaining to the coating surface.

The brilliance evaluation value is an index determined according to at least one of, e.g., smoothness of the coating surface, a proportion of light reflected by the coating surface via diffuse reflection, and resolution of an image appearing on the coating surface. A brilliance evaluation value pertaining to an evaluated coating surface is a numeric value assigned in advance to the evaluated coating surface according to another technique for evaluating brilliance.

For example, the evaluation model setting unit 120 can set an evaluation model that outputs a brilliance evaluation value pertaining to the coating surface in response to an input including the shape information and the surface roughness information. In this case, the evaluation model is a trained model generated through machine learning that is based on teaching data in which shape information pertaining to the evaluated coating surface, surface roughness information pertaining to the evaluated coating surface, and the brilliance evaluation value pertaining to the evaluated coating surface are taken as a set.

The evaluation model setting unit 120 can also set an evaluation model that outputs the brilliance evaluation value pertaining to the coating surface in response to an input including the surface roughness information and the material information. In this case, the evaluation model is a trained model generated through machine learning that is based on teaching data in which the surface roughness information pertaining to the evaluated coating surface, material information pertaining to the evaluated coating surface, and the brilliance evaluation value pertaining to the evaluated coating surface are taken as a set.

The evaluation model setting unit 120 can also set an evaluation model that outputs the brilliance evaluation value pertaining to the coating surface in response to an input including the material information and the shape information. In this case, the evaluation model is a trained model generated through machine learning that is based on teaching data in which the material information pertaining to the evaluated coating surface, the shape information pertaining to the evaluated coating surface, and the brilliance evaluation value pertaining to the evaluated coating surface are taken as a set.

The evaluation model setting unit 120 can also set an evaluation model that outputs the brilliance evaluation value pertaining to the coating surface in response to an input including the material information, the shape information, and the surface roughness information. In this case, the evaluation model is a trained model generated through machine learning that is based on teaching data in which the material information pertaining to the evaluated coating surface, the shape information pertaining to the evaluated coating surface, the surface roughness information pertaining to the evaluated coating surface, and the brilliance evaluation value pertaining to the evaluated coating surface are taken as a set.

Examples of a technique for generating the trained model through machine learning include techniques using one, or a combination of two or more, from among neural networks, support vector machines, Random Forest, XGBoost, LightGBM, PLS regression, Ridge regression, and Lasso regression. The technique for generating the trained model through machine learning is not limited to the examples listed above.

The evaluation model setting unit 120 can perform machine learning on the basis of teaching data acquired from a database (not shown) to set the evaluation model. Alternatively, the evaluation model can be stored in a database (not shown) in advance, and the evaluation model setting unit 120 can set the evaluation model acquired from the database.

The evaluation model can be configured from a neural network that includes an input layer and an output layer. More specifically, the neural network typically has an input layer, a plurality of hidden layers, and an output layer, and each of the layers (input layer, hidden layers, and output layer) includes a plurality of neurons.

The input layer includes the shape information representing the curved shape of the coating surface and the surface roughness information representing the surface roughness of the coating surface as input data to be processed via the hidden layers. The brilliance evaluation value pertaining to the coating surface that is allocated to the input data by the neural network is allocated to the neurons of the output layer. Specifically, output data outputted from the output layer serves as the brilliance evaluation value pertaining to the coating surface.

The neural network constituting the evaluation model is trained by the evaluation model setting unit 120 so as to reproduce imparted teaching data.

In a case where teaching data is imparted in which the shape information pertaining to the evaluated coating surface, the surface roughness information pertaining to the evaluated coating surface, and the brilliance evaluation value pertaining to the evaluated coating surface are taken as a set, the neural network is trained through machine learning so as to output the brilliance evaluation value pertaining to the coating surface as output data when input data including the shape information and the surface roughness information is inputted.

In a case where teaching data is imparted in which the surface roughness information pertaining to the evaluated coating surface, the material information pertaining to the evaluated coating surface, and the brilliance evaluation value pertaining to the evaluated coating surface are taken as a set, the neural network is trained through machine learning so as to output the brilliance evaluation value pertaining to the coating surface as output data when input data including the surface roughness information and the material information is inputted.

In a case where teaching data is imparted in which the material information pertaining to the evaluated coating surface, the shape information pertaining to the evaluated coating surface, and the brilliance evaluation value pertaining to the evaluated coating surface are taken as a set, the neural network is trained through machine learning so as to output the brilliance evaluation value pertaining to the coating surface as output data when input data including the material information and the shape information is inputted.

In a case where teaching data is imparted in which the material information pertaining to the evaluated coating surface, the shape information pertaining to the evaluated coating surface, the surface roughness information pertaining to the evaluated coating surface, and the brilliance evaluation value pertaining to the evaluated coating surface are taken as a set, the neural network is trained through machine learning so as to output the brilliance evaluation value pertaining to the coating surface as output data when input data including the material information, the shape information, and the surface roughness information is inputted.

Thus, machine learning that is based on the teaching data is carried out to generate an evaluation model that outputs the brilliance evaluation value pertaining to the coating surface in response to the input.

The evaluation value estimation unit 130 estimates an evaluation value that corresponds to the input by using the set evaluation model.

When the set evaluation model is a trained model generated through machine learning that is based on teaching data in which the shape information pertaining to the evaluated coating surface, the surface roughness information pertaining to the evaluated coating surface, and the brilliance evaluation value pertaining to the evaluated coating surface are taken as a set, the evaluation value estimation unit 130 inputs the shape information and the surface roughness information to the evaluation model. The evaluation value estimation unit 130 then employs a value outputted from the evaluation model as an evaluation value that corresponds to a combination of the shape information and the surface roughness information. The evaluation value that corresponds to the combination of the shape information and the surface roughness information is an estimated evaluation value relating to the brilliance of the coating surface.

When the set evaluation model is a trained model generated through machine learning that is based on teaching data in which the surface roughness information pertaining to the evaluated coating surface, the material information pertaining to the evaluated coating surface, and the brilliance evaluation value pertaining to the evaluated coating surface are taken as a set, the evaluation value estimation unit 130 inputs the surface roughness information and the material information to the evaluation model. The evaluation value estimation unit 130 then employs a value outputted from the evaluation model as an evaluation value that corresponds to a combination of the surface roughness information and the material information. The evaluation value that corresponds to the combination of the surface roughness information and the material information is an estimated evaluation value relating to the brilliance of the coating surface.

When the set evaluation model is a trained model generated through machine learning that is based on teaching data in which the material information pertaining to the evaluated coating surface, the shape information pertaining to the evaluated coating surface, and the brilliance evaluation value pertaining to the evaluated coating surface are taken as a set, the evaluation value estimation unit 130 inputs the material information and the shape information to the evaluation model. The evaluation value estimation unit 130 then employs a value outputted from the evaluation model as an evaluation value that corresponds to a combination of the material information and the shape information. The evaluation value that corresponds to the combination of the material information and the shape information is an estimated evaluation value relating to the brilliance of the coating surface.

When the set evaluation model is a trained model generated through machine learning that is based on teaching data in which the material information pertaining to the evaluated coating surface, the shape information pertaining to the evaluated coating surface, the surface roughness information pertaining to the evaluated coating surface, and the brilliance evaluation value pertaining to the evaluated coating surface are taken as a set, the evaluation value estimation unit 130 inputs the shape information, the surface roughness information, and the material information to the evaluation model. The evaluation value estimation unit 130 then employs a value outputted from the evaluation model as an evaluation value that corresponds to a combination of the shape information, the surface roughness information, and the material information. The evaluation value that corresponds to the combination of the shape information, the surface roughness information, and the material information is an estimated evaluation value relating to the brilliance of the coating surface.

The position-specifying unit 140 associates the captured image and the shape information with the surface roughness information and records a position on the coating surface for which the surface roughness information was acquired. More specifically, the position-specifying unit 140 associates the captured image and the shape information from when the surface roughness information was acquired with the surface roughness information and records these items of information in a database (not shown). The position on the coating surface from when the surface roughness information was acquired is thereby specified.

The position-specifying unit 140 can also record, in association with the captured image, a position on the coating surface for which the surface roughness information and the material information were acquired, thereby specifying the position on the coating surface from when the surface roughness information and the material information were acquired.

The output unit 400 outputs the estimated evaluation value relating to the brilliance of the coating surface.

Figure 2:
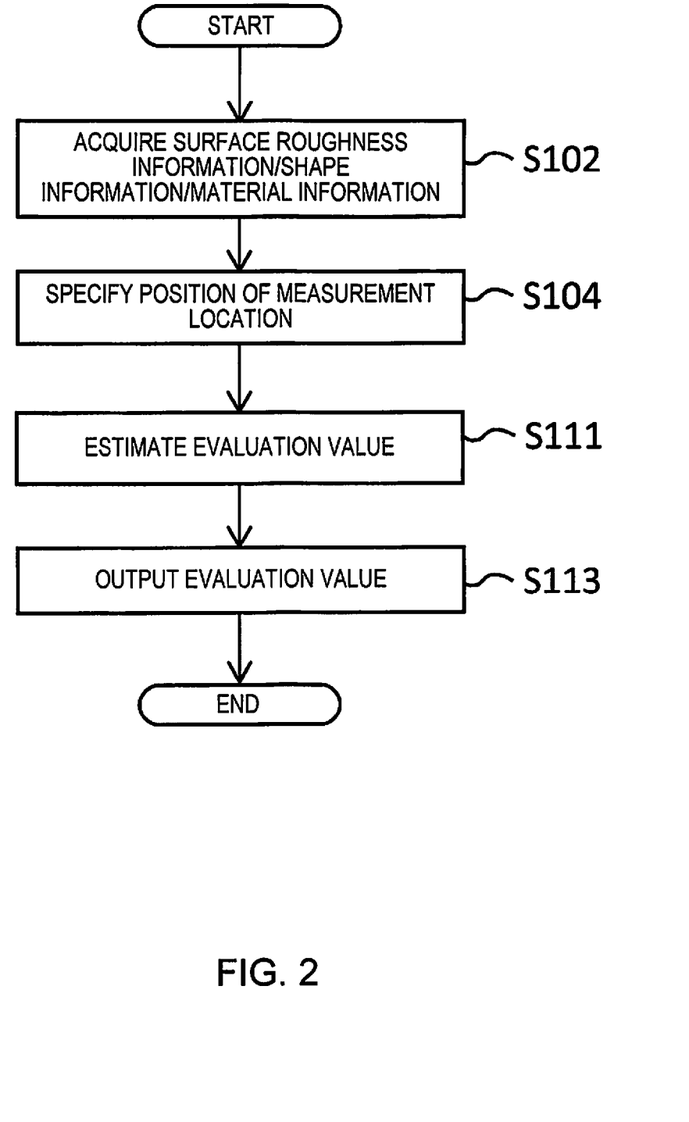
FIG. 2 is a flow chart showing a process of the coating evaluation device according to the one embodiment of the present invention.

A procedure of a process performed by the coating evaluation device according to the present embodiment shall be described next with reference to the flow chart in FIG. 2. The evaluation model has already been set by the evaluation model setting unit 120 before the process shown in the flow chart in FIG. 2 is started.

In step S102, the surface roughness acquisition unit 17 acquires the surface roughness information representing the surface roughness of the coating surface for which the coating is being evaluated. Additionally, the shape acquisition unit 11 can acquire the shape information representing the curved shape of the coating surface. The material acquisition unit 13 can acquire the material information representing the material of the coating surface. The image acquisition unit 21 can acquire the captured image of the coating surface.

In step S104, the position-specifying unit 140 associates the captured image and the shape information with the surface roughness information and records the position on the coating surface for which the surface roughness information was acquired, thereby specifying the position on the coating surface from when the surface roughness information was acquired.

The position-specifying unit 140 can also record, in association with the captured image, the position on the coating surface for which the surface roughness information and the material information were acquired, thereby specifying the position on the coating surface from when the surface roughness information and the material information were acquired.

In step S111, the evaluation value estimation unit 130 estimates the evaluation value. More specifically, the evaluation value estimation unit 130 calculates output from the evaluation model that corresponds to the input to the evaluation model. The value calculated from the evaluation model is estimated as the evaluation value that corresponds to the input to the evaluation model.

For example, when the evaluation model is a trained model generated through machine learning that is based on teaching data in which the shape information pertaining to the evaluated coating surface, the surface roughness information pertaining to the evaluated coating surface, and the brilliance evaluation value pertaining to the evaluated coating surface are taken as a set, the evaluation value estimation unit 130 inputs a combination of the shape information and the surface roughness information to the evaluation model. The evaluation value estimation unit 130 then estimates the evaluation value that corresponds to the combination of the shape information and the surface roughness information.

When the evaluation model is a trained model generated through machine learning that is based on teaching data in which the shape information pertaining to the evaluated coating surface, the material information pertaining to the evaluated coating surface, and the brilliance evaluation value pertaining to the evaluated coating surface are taken as a set, the evaluation value estimation unit 130 inputs a combination of the shape information and the material information to the evaluation model. The evaluation value estimation unit 130 then estimates the evaluation value that corresponds to the combination of the shape information and the material information.

When the evaluation model is a trained model generated through machine learning that is based on teaching data in which the shape information pertaining to the evaluated coating surface, the surface roughness information pertaining to the evaluated coating surface, the material information pertaining to the evaluated coating surface, and the brilliance evaluation value pertaining to the evaluated coating surface are taken as a set, the evaluation value estimation unit 130 inputs a combination of the shape information, the surface roughness information, and the material information to the evaluation model. The evaluation value estimation unit 130 then estimates the evaluation value that corresponds to the combination of the shape information, the surface roughness information, and the material information.

In step S113, the output unit 400 outputs the evaluation value estimated by the evaluation value estimation unit 130.

As was discussed in detail above, in the coating evaluation device, coating evaluation method, and coating evaluation program according to the present embodiment, shape information representing a curved shape of a coating surface and surface roughness information representing a surface roughness of the coating surface are acquired, and an evaluation value that corresponds to a combination of the shape information and the surface roughness information is estimated by using an evaluation model that outputs a brilliance evaluation value pertaining to the coating surface in response to an input including the shape information and the surface roughness information.

This makes it possible to accurately evaluate the brilliance of the coating surface. In particular, it is possible to accurately evaluate the brilliance of the coating surface even when the coating surface is curved. Additionally, because the evaluation value is estimated by the evaluation model, the need for dedicated equipment or experts for evaluating the brilliance of the coating surface is obviated, and a cost in evaluating the brilliance of the coating surface can be reduced.

In the coating evaluation device, coating evaluation method, and coating evaluation program according to the present embodiment, the evaluation model can be a trained model generated through machine learning that is based on teaching data in which shape information pertaining to an evaluated coating surface, surface roughness information pertaining to the evaluated coating surface, and a brilliance evaluation value pertaining to the evaluated coating surface are taken as a set. This makes it possible to accurately evaluate the brilliance of the coating surface by using an evaluation model generated from teaching data relating to evaluated coating surfaces that have a variety of curved-surface shapes.

In the coating evaluation device, coating evaluation method, and coating evaluation program according to the present embodiment, design data pertaining to the coating surface can be acquired as the shape information, or measurement data obtained by measuring the coating surface can be acquired as the shape information. This makes it possible to accurately evaluate the brilliance of the coating surface while considering the curved shape of the coating surface.

In the coating evaluation device, coating evaluation method, and coating evaluation program according to the present embodiment, a captured image of the coating surface can be acquired, the captured image and the shape information can be associated with the surface roughness information, and a position on the coating surface for which the surface roughness information was acquired can be recorded. The position on the coating surface from when the surface roughness information was acquired is thereby specified. Additionally, it is possible to accurately evaluate the brilliance of the coating surface.

In the coating evaluation device, coating evaluation method, and coating evaluation program according to the present embodiment, material information representing a material of the coating surface can be acquired, and an evaluation value that corresponds to a combination of the shape information, the surface roughness information, and the material information can be estimated by using an evaluation model that outputs a brilliance evaluation value pertaining to the coating surface in response to an input including the material information, the shape information, and the surface roughness information. Additionally using the material information pertaining to the coating surface in addition to the shape information and surface roughness information pertaining to the coating surface when evaluating the brilliance of the coating surface makes it possible to accurately evaluate the brilliance of the coating surface.

In the coating evaluation device, coating evaluation method, and coating evaluation program according to the present embodiment, the evaluation model can be a trained model generated through machine learning that is based on teaching data in which material information pertaining to the evaluated coating surface, the shape information pertaining to the evaluated coating surface, the surface roughness information pertaining to the evaluated coating surface, and the brilliance evaluation value pertaining to the evaluated coating surface are taken as a set. This makes it possible to accurately evaluate the brilliance of the coating surface by using an evaluation model generated from teaching data relating to evaluated coating surfaces that have a variety of curved-surface shapes and are configured from a variety of materials.

In the coating evaluation device, coating evaluation method, and coating evaluation program according to the present embodiment, the surface roughness information representing the surface roughness of the coating surface and the material information representing the material of the coating surface are acquired, and an evaluation value that corresponds to a combination of the surface roughness information and the material information is estimated by using an evaluation model that outputs a brilliance evaluation value pertaining to the coating surface in response to an input including the surface roughness information and the material information.

This makes it possible to accurately evaluate the brilliance of the coating surface. Additionally, because the evaluation value is estimated by the evaluation model, the need for dedicated equipment or experts for evaluating the brilliance of the coating surface is obviated, and a cost in evaluating the brilliance of the coating surface can be reduced.

In the coating evaluation device, coating evaluation method, and coating evaluation program according to the present embodiment, the evaluation model can be a trained model generated through machine learning that is based on teaching data in which the surface roughness information pertaining to the evaluated coating surface, the material information pertaining to the evaluated coating surface, and the brilliance evaluation value pertaining to the evaluated coating surface are taken as a set. This makes it possible to accurately evaluate the brilliance of the coating surface by using an evaluation model generated from teaching data relating to evaluated coating surfaces that have a variety of surface roughnesses and materials.

In the coating evaluation device, coating evaluation method, and coating evaluation program according to the present embodiment, design data relating to at least one of a coating thickness, a material reflectivity, a brightness, a saturation, and a hue of the coating surface can be acquired as the material information. This makes it possible to accurately evaluate the brilliance of the coating surface while considering the material of the coating surface in greater detail.

In the coating evaluation device, coating evaluation method, and coating evaluation program according to the present embodiment, measurement data that is obtained by measuring the coating surface and that relates to at least one of the coating thickness, the material reflectivity, the brightness, the saturation, and the hue of the coating surface can be acquired as the material information. This makes it possible to accurately evaluate the brilliance of the coating surface while considering the material of the coating surface in greater detail.

In the coating evaluation device, coating evaluation method, and coating evaluation program according to the present embodiment, a captured image of the coating surface can be acquired, and a position on the coating surface for which the surface roughness information and the material information were acquired can be recorded in association with the captured image. The position on the coating surface from when the surface roughness information and the material information were acquired is thereby specified. Additionally, it is possible to accurately evaluate the brilliance of the coating surface.

In the coating evaluation device, coating evaluation method, and coating evaluation program according to the present embodiment, the brilliance evaluation value pertaining to the coating surface can be an index determined according to at least one of smoothness of the coating surface, a proportion of light reflected by the coating surface via diffuse reflection, and resolution of an image appearing on the coating surface. A reference for evaluation of the brilliance of the coating surface is thus elucidated.

The evaluation model used in the coating evaluation device, coating evaluation method, and coating evaluation program according to the present embodiment can be configured from a neural network that includes an input layer and an output layer. The evaluation model can be trained such that input data that is inputted to the input layer and includes the shape information representing the curved shape of the coating surface and the surface roughness information representing the surface roughness of the coating surface, and output data that is outputted from the output layer and includes the brilliance evaluation value pertaining to the coating surface, are associated with one another.

This makes it possible to express a relationship established between the shape information and surface roughness information pertaining to the coating surface and the brilliance evaluation value pertaining to the coating surface. As a result, the need for dedicated equipment or experts for evaluating the brilliance of the coating surface is obviated, and a cost in evaluating the brilliance of the coating surface can be reduced.

The evaluation model used in the coating evaluation device, coating evaluation method, and coating evaluation program according to the present embodiment can be configured such that teaching data in which the shape information representing the curved shape of the coating surface, the surface roughness information representing the surface roughness of the coating surface, and the brilliance evaluation value pertaining to the coating surface are taken as a set is acquired, and said evaluation model can be generated by carrying out machine learning that is based on the teaching data and adopting a configuration such that a brilliance evaluation value pertaining to the coating surface is outputted in response to an input including the shape information and the surface roughness information. This makes it possible to obtain an evaluation model that expresses a relationship established between the shape information and surface roughness information pertaining to the coating surface and the brilliance evaluation value pertaining to the coating surface.

The evaluation model used in the coating evaluation device, coating evaluation method, and coating evaluation program according to the present embodiment can be configured from a neural network that includes an input layer and an output layer. The evaluation model can be trained such that input data that is inputted to the input layer and includes the surface roughness information representing the surface roughness of the coating surface and the material information representing the material of the coating surface, and output data that is outputted from the output layer and includes the brilliance evaluation value pertaining to the coating surface, are associated with one another.

This makes it possible to express a relationship established between the surface roughness information and material information pertaining to the coating surface and the brilliance evaluation value pertaining to the coating surface. As a result, the need for dedicated equipment or experts for evaluating the brilliance of the coating surface is obviated, and a cost in evaluating the brilliance of the coating surface can be reduced.

The evaluation model used in the coating evaluation device, coating evaluation method, and coating evaluation program according to the present embodiment can be configured such that teaching data in which the surface roughness information representing the surface roughness of the coating surface, the material information representing the material of the coating surface, and the brilliance evaluation value pertaining to the coating surface are taken as a set is acquired, and said evaluation model can be generated by carrying out machine learning that is based on the teaching data and adopting a configuration such that a brilliance evaluation value pertaining to the coating surface is outputted in response to an input including the surface roughness information and the material information. This makes it possible to obtain an evaluation model that expresses a relationship established between the surface roughness information and material information pertaining to the coating surface and the brilliance evaluation value pertaining to the coating surface.

The functions indicated in the embodiment described above can be implemented using one or a plurality of processing circuits. The processing circuits include a programmed processor, an electronic circuit, or the like, and furthermore include a device such as an application-specific integrated circuit (ASIC), a circuit configuration element disposed so as to execute the described functions, or the like.

The content of the present invention is described above in accordance with an embodiment, but the present invention is not limited to the abovementioned descriptions; it would be obvious to a person skilled in the art that various modifications and improvements can be made. The statements and drawings that form part of the present disclosure should not be understood to limit the present invention. A variety of alternative embodiments, examples, and fields of application would be obvious to a person skilled in the art from the present disclosure.

It shall be apparent that the present invention includes a variety of embodiments and the like that are not described above. Therefore, the technical scope of the present invention is established only by the invention-defining matter pertaining to the valid claims from the above descriptions.

The invention claimed is:

1. A coating evaluation device comprising:
   a shape acquisition unit configured to acquire shape information representing a curved shape of a coating surface;
   a surface roughness acquisition unit configured to acquire surface roughness information representing a surface roughness of the coating surface; and
   a controller configured to
   estimate an evaluation value that corresponds to a combination of the shape information and the surface roughness information by using an evaluation model that outputs a brilliance evaluation value pertaining to the coating surface in response to an input including the shape information and the surface roughness information.

2. The coating evaluation device according to claim 1, wherein
   the evaluation model is a trained model generated through machine learning that is based on teaching data in which the shape information pertaining to an evaluated coating surface, the surface roughness information pertaining to the evaluated coating surface, and the brilliance evaluation value pertaining to the evaluated coating surface.

3. The coating evaluation device according to claim 1, wherein
   the shape acquisition unit is configured to acquire design data pertaining to the coating surface as the shape information.

4. The coating evaluation device according to claim 1, wherein
   the shape acquisition unit is configured to acquire measurement data obtained by measuring the coating surface as the shape information.

5. The coating evaluation device according to claim 1, further comprising
   an image acquisition unit configured to acquire a captured image of the coating surface, and
   the controller being configured to associate the captured image and the shape information with the surface roughness information and record a position on the coating surface for which the surface roughness information was acquired.

6. The coating evaluation device according to claim 1, further comprising
   a material acquisition unit configured to acquire material information representing a material of the coating surface; and
   the controller being configured to estimate an evaluation value that corresponds to a combination of the shape information, the surface roughness information, and the material information by using the evaluation model that outputs the brilliance evaluation value pertaining to the coating surface in response to an input including the material information, the shape information, and the surface roughness information.

7. The coating evaluation device according to claim 6, wherein
   the evaluation model is a trained model generated through machine learning that is based on teaching data in which the material information pertaining to an evaluated coating surface, the shape information pertaining to the evaluated coating surface, the surface roughness information pertaining to the evaluated coating surface, and the brilliance evaluation value pertaining to the evaluated coating surface.

8. A coating evaluation device comprising:
a surface roughness acquisition unit configured to acquire surface roughness information representing a surface roughness of a coating surface;
a material acquisition unit configured to acquire material information representing at least one of a type of material constituting the coating surface, a coating thickness of the coating surface, and an amount, shape, or orientation of a lustrous material included in a coating of the coating surface; and
a controller configured to
estimate an evaluation value that corresponds to a combination of the surface roughness information and the material information by using an evaluation model that outputs a brilliance evaluation value pertaining to the coating surface in response to an input including the surface roughness information and the material information.

9. The coating evaluation device according to claim 8, wherein
the evaluation model is a trained model generated through machine learning that is based on teaching data in which the surface roughness information pertaining to an evaluated coating surface, the material information pertaining to the evaluated coating surface, and the brilliance evaluation value pertaining to the evaluated coating surface.

10. The coating evaluation device according to claim 8, wherein
the material information includes design data that relates to at least one of a material reflectivity, a brightness, a saturation, and a hue of the coating surface.

11. The coating evaluation device according to claim 8, wherein
the material information includes measurement data that is obtained by measuring the coating surface and that relates to at least one of a material reflectivity, a brightness, a saturation, and a hue of the coating surface.

12. The coating evaluation device according to claim 8, further comprising
an image acquisition unit configured to acquire a captured image of the coating surface; and
the controller being configured to record, in association with the captured image, a position on the coating surface for which the surface roughness information and the material information were acquired.

13. The coating evaluation device according to claim 1, wherein
the brilliance evaluation value pertaining to the coating surface is an index determined according to at least one of smoothness of the coating surface, a proportion of light reflected by the coating surface via diffuse reflection, and resolution of an image appearing on the coating surface.

14. A coating evaluation method comprising:
acquiring shape information representing a curved shape of a coating surface;
acquiring surface roughness information representing a surface roughness of the coating surface; and
estimating an evaluation value that corresponds to a combination of the shape information and the surface roughness information by using an evaluation model that outputs a brilliance evaluation value pertaining to the coating surface in response to an input including the shape information and the surface roughness information.

15. A non-transitory computer-readable storage medium having a coating evaluation program stored thereon, the program being executable by a computer to control
a shape acquisition unit configured to acquire shape information representing a curved shape of a coating surface, and
a surface roughness acquisition unit configured to acquire surface roughness information representing a surface roughness of the coating surface,
to execute
a step for acquiring the shape information by using the shape acquisition unit,
a step for acquiring the surface roughness information by using the surface roughness acquisition unit, and
a step for estimating an evaluation value that corresponds to a combination of the shape information and the surface roughness information by using an evaluation model that outputs a brilliance evaluation value pertaining to the coating surface in response to an input including the shape information and the surface roughness information.

16. A non-transitory computer evaluation model disposed upon a non-transitory computer readable storage medium and configured from a neural network that includes an input layer and an output layer, the evaluation model being trained by associating
input data that is inputted to the input layer and that includes shape information representing a curved shape of a coating surface and surface roughness information representing a surface roughness of the coating surface, and
output data that is outputted from the output layer and that includes a brilliance evaluation value pertaining to the coating surface.

17. An evaluation model generation method comprising:
acquiring teaching data in which shape information representing a curved shape of a coating surface, surface roughness information representing a surface roughness of the coating surface, and a brilliance evaluation value pertaining to the coating surface; and
performing machine learning based on the teaching data to generate an evaluation model that outputs the brilliance evaluation value pertaining to the coating surface in response to an input including the shape information and the surface roughness information.

18. A coating evaluation method comprising:
acquiring surface roughness information representing a surface roughness of a coating surface;
acquiring material information representing at least one of a type of material constituting the coating surface, a coating thickness of the coating surface, and an amount, shape, or orientation of a lustrous material included in a coating of the coating surface; and
estimating an evaluation value that corresponds to a combination of the surface roughness information and the material information by using an evaluation model that outputs a brilliance evaluation value pertaining to the coating surface in response to an input including the surface roughness information and the material information.

19. A non-transitory computer-readable storage medium having a coating evaluation program stored thereon, the program being executable by a computer to control
- a surface roughness acquisition unit configured to acquire surface roughness information representing a surface roughness of a coating surface, and
- a material acquisition unit configured to acquire material information including information representing at least one of a type of material constituting the coating surface, a coating thickness of the coating surface, and an amount, shape, or orientation of a lustrous material included in a coating of the coating surface, to execute
- a step for acquiring the surface roughness information by using the surface roughness acquisition unit,
- a step for acquiring the material information by using the material acquisition unit, and
- a step for estimating an evaluation value that corresponds to a combination of the surface roughness information and the material information by using an evaluation model that outputs a brilliance evaluation value pertaining to the coating surface in response to an input including the surface roughness information and the material information.

20. A non-transitory computer evaluation model disposed upon a non-transitory computer readable storage medium and configured from a neural network that includes an input layer and an output layer, the evaluation model being trained by associating
- input data that is inputted to the input layer and includes surface roughness information representing a surface roughness of a coating layer and material information including information representing at least one of a type of material constituting the coating surface, a coating thickness of the coating surface, and an amount, shape, or orientation of a lustrous material included in a coating of the coating surface, and a brilliance evaluation value pertaining to the coating surface, and
- output data that is outputted from the output layer and includes a brilliance evaluation value pertaining to the coating layer.

21. An evaluation model generation method comprising:
- acquiring teaching data in which surface roughness information representing a surface roughness of a coating surface, material information including information representing at least one of a type of material constituting the coating surface, a coating thickness of the coating surface, and an amount, shape, or orientation of a lustrous material included in a coating of the coating surface, and a brilliance evaluation value pertaining to the coating surface; and
- performing machine learning based on the teaching data to generate an evaluation model that outputs the brilliance evaluation value pertaining to the coating surface in response to an input including the surface roughness information and the material information.

* * * * *